(12) United States Patent
Shinozaki

(10) Patent No.: US 10,780,971 B2
(45) Date of Patent: Sep. 22, 2020

(54) METHODS OF MANUFACTURING A PANEL HAVING A COMPOSITE STRINGER FOR A VEHICLE

(71) Applicant: The Boeing Company, Chicago, IL (US)

(72) Inventor: John Makoto Shinozaki, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 92 days.

(21) Appl. No.: 15/963,425

(22) Filed: Apr. 26, 2018

(65) Prior Publication Data

US 2019/0329856 A1    Oct. 31, 2019

(51) Int. Cl.
| | | |
|---|---|---|
| *B29D 99/00* | (2010.01) | |
| *B64C 1/06* | (2006.01) | |
| *B64C 1/12* | (2006.01) | |
| *B64F 5/10* | (2017.01) | |
| *B29L 31/30* | (2006.01) | |

(52) U.S. Cl.
CPC ............ *B64C 1/12* (2013.01); *B29D 99/0003* (2013.01); *B64C 1/064* (2013.01); *B64F 5/10* (2017.01); *B29L 2031/3076* (2013.01)

(58) Field of Classification Search
CPC .. B64C 1/12; B64C 1/064; B64F 5/10; B29D 99/0003; B29L 2031/3076
See application file for complete search history.

(56) References Cited

U.S. PATENT DOCUMENTS

| | | | |
|---|---|---|---|
| 2,693,011 A | * | 11/1954 | Fernberg ................. F16B 5/121 49/490.1 |
| 6,495,086 B1 | | 12/2002 | Uytterhaeghe et al. |
| 8,465,613 B2 | | 6/2013 | Rotter et al. |
| 8,551,382 B2 | | 10/2013 | Anderson et al. |
| 8,557,165 B2 | | 10/2013 | Jones et al. |
| 8,601,694 B2 | | 12/2013 | Brennan et al. |
| 9,162,380 B2 | | 10/2015 | Jones et al. |

(Continued)

FOREIGN PATENT DOCUMENTS

| | | |
|---|---|---|
| EP | 2508326 A1 | 10/2012 |
| EP | 2561979 A2 | 2/2013 |

(Continued)

OTHER PUBLICATIONS

EP Office Action dated Oct. 14, 2019 in re EP Application No. 19164970.6 filed Mar. 25, 2019.

(Continued)

*Primary Examiner* — David P Bryant
*Assistant Examiner* — Lawrence Averick
(74) *Attorney, Agent, or Firm* — Coats & Bennett, PLLC

(57) ABSTRACT

Methods of manufacturing a panel for a vehicle that includes forming a stringer from separate charges. The method can include positioning a forming sheet between the charges that are aligned in an overlapping arrangement. The charges can be held together and the forming sheet can be used to separate the ends of the charges to form flanges that extend outward from a blade. While still secured together, the formed stringer can be moved to a panel and positioned with the flanges contacting against the panel. Filler material can be positioned in an opening formed between the ends of the flanges.

20 Claims, 14 Drawing Sheets

(56) References Cited

U.S. PATENT DOCUMENTS

| | | |
|---|---|---|
| 9,162,396 B2 | 10/2015 | Coxon et al. |
| 9,254,619 B2 | 2/2016 | Rotter et al. |
| 9,387,627 B2 | 7/2016 | Brennan et al. |
| 9,387,628 B2 | 7/2016 | Chapman et al. |
| 9,561,602 B2 | 2/2017 | Jones et al. |
| 2004/0265536 A1 | 12/2004 | Sana et al. |
| 2009/0320995 A1 | 12/2009 | Menendez Martin et al. |
| 2013/0174396 A1 | 7/2013 | Torres Martinez |
| 2014/0103585 A1 | 4/2014 | Coxon et al. |
| 2015/0174831 A1 | 6/2015 | Miguez Charines et al. |
| 2015/0183503 A1 | 7/2015 | Miguez Charines et al. |
| 2017/0008217 A1 | 1/2017 | Chapman et al. |
| 2019/0329508 A1* | 10/2019 | Shinozaki ............. B29C 70/462 |
| 2019/0329856 A1* | 10/2019 | Shinozaki .......... B29D 99/0003 |

FOREIGN PATENT DOCUMENTS

| | | |
|---|---|---|
| EP | 2868465 A1 | 5/2015 |
| EP | 2982500 A1 | 2/2016 |
| WO | 2015011316 A1 | 1/2015 |

OTHER PUBLICATIONS

European Search Report dated Nov. 19, 2019 in re EP Application No. 19164961.5.
European Search Report dated Oct. 9, 2019 in re EP Application No. 19157346.8.

* cited by examiner

METHODS OF MANUFACTURING A PANEL HAVING A COMPOSITE STRINGER FOR A VEHICLE

TECHNOLOGICAL FIELD

The present disclosure generally relates to manufacturing a panel that includes a composite stringer for a vehicle. More particularly, the present disclosure relates to methods of fabricating stringers that are constructed from separate charges that are aligned and formed during the fabrication process and attached to a panel.

BACKGROUND

Composite reinforcing substructures such as stringers, sometimes referred to as blade stiffeners, are frequently used in the aircraft industry. These stringers can be fabricated by combining two or more charges. For example, stringers can be fabricated by combining two charges each having a sectional L-shape in a back-to-back orientation.

An issue is aligning the charges that form the stringer. Misalignment of the charges at a blade tip could cause resin pooling and cracking when the stringer is later exposed to certain thermal cycles at extreme temperatures.

The fabrication process can include moving the charges. The charges should be supported to prevent sagging which could lead to undesired fiber buckling and/or wrinkling. Further, the charges can move through a variety of different fabrication steps. It is often time consuming to attach and detach the charges from different tools for the different fabrication steps. This can also lead to undesired fiber buckling/wrinkling.

SUMMARY

The present application is directed to methods of fabricating a stringer from separate charges. The charges are manipulated and aligned together. The charges can be secured together and then flanges formed. The secured charges can then be moved together and attached to a panel.

One aspect is directed to a method of manufacturing a panel for a vehicle. The method includes trimming second ends of each of first and second charges; overlapping the first and second charges and aligning the second ends and positioning forming sheets between the first and second charges; securing blades of the first and second charges together with the blades being positioned on an opposing end of the charges from the second ends; while the first and second charges are secured together, using the forming sheet and separating first and second flanges of the first and second charges at the second ends and forming first and second flanges that are separated by a groove; filling a groove formed between the flanges with a filler material; and while the first and second charges are secured together, placing the first and second flanges on a panel with the first and second flanges contacting against the panel and the groove positioned at the panel.

In one aspect, the method also includes trimming first ends of the first and second charges after aligning the second ends and prior to securing the blades together.

In one aspect, overlapping the first and second charges includes stacking the first and second charges together with the forming sheet between the first and second charges.

In one aspect, securing blade sections of the first and second charges together includes attaching a stringer tool to the blade sections with the stringer tool including a primary clamp that attaches to the charges at the first ends and a secondary clamp that attaches to the charges along the blade sections and being spaced away from the primary clamp.

In one aspect, positioning forming sheets between the first and second charges includes folding a single sheet and forming first and second sheet layers with the first sheet layer contacting against the first charge and the second sheet layer contacting against the second charge.

In one aspect, the method also includes one of co-bonding or co-curing the panel and the first and second charges.

In one aspect, the method also includes securing the blades of the first and second charges together with a stringer tool that remains attached to the first and second charges while placing the first and second flanges on the panel.

One aspect is directed to a method of manufacturing a panel for a vehicle. The method includes: stacking together first and second charges and aligning at least one end of each of the first and second charges; positioning first and second forming sheets between the first and second charges that are stacked together; securing the first and second charges together; while the first and second charges are secured together, pulling apart the first and second forming sheets and forming a first flange with the first charge and a second flange with the second charge; filling a groove formed between the first and second flanges with a filler material; and while the first and second charges are secured together, placing the first and second charges on a panel with the first and second flanges contacting against the panel.

In one aspect, the method also includes preparing the first and second charges by trimming a second end of each of the first and second charges prior to stacking the first and second charges.

In one aspect, positioning the first and second forming sheets between the first and second charges that are stacked together includes folding a beginning sheet into first and second layers with the first layer including the first forming sheet and the second layer including the second forming sheet.

In one aspect, the method also includes unfolding the beginning sheet while pulling apart the first and second forming sheets and forming the first and second flanges.

In one aspect, filling the opening includes inserting a filler material into the opening and prior to placing the first and second charges onto the panel.

In one aspect, securing the first and second charges together includes attaching a stringer tool to blades of the first and second charges with the stringer tool including a primary clamp that attaches to the charges at first ends and a secondary clamp that attaches to the charges along the blades and spaced away from the primary clamp.

One aspect is directed to a method of manufacturing a panel for a vehicle. The method includes: positioning forming sheets between first and second charges that are stacked in an overlapping arrangement; trimming each of the first and second charges while in the overlapping arrangement; attaching a stringer tool to the first and second charges and securing together blades of the first and second charges; while the first and second charges are secured together, applying forces to the forming sheets and separating second ends of the first and second charges and forming first and second flanges that extend outward from the blades; filling a groove formed between the first and second flanges with a filler material; and while the first and second charges are secured together, placing the first and second charges on a panel with the first and second flanges contacting against the panel.

In one aspect, the method also includes aligning second ends of the first and second charges prior to trimming the first ends of the first and second charges.

In one aspect, positioning the forming sheets between the first and second charges that are stacked in the overlapping arrangement includes extending the forming sheets outward beyond the second ends of the first and second charges and positioning the forming sheets inward and away from the first ends of the first and second charges.

In one aspect, the method also includes attaching a stringer tool at the first ends of the first and second charges and securing the first and second charges together.

In one aspect, the method also includes unfolding the forming sheets that are constructed from a single beginning sheet and forming the first and second flanges.

One aspect is directed to a panel of a vehicle manufactured according to one of the methods.

One aspect is directed to a vehicle with a panel manufactured according to one of the methods.

DETAILED DESCRIPTION

The present application is directed to methods of manufacturing a composite stringer for a vehicle. This includes forming a stringer from separate charges that includes positioning a forming sheet between the charges that are aligned in an overlapping arrangement. The charges are held together and the forming sheet is used to separate the ends of the charges to form flanges that extend outward from the blades. While still be secured together, the formed stringer can be moved to a panel and positioned with the flanges contacting against the panel.

Figure 1:
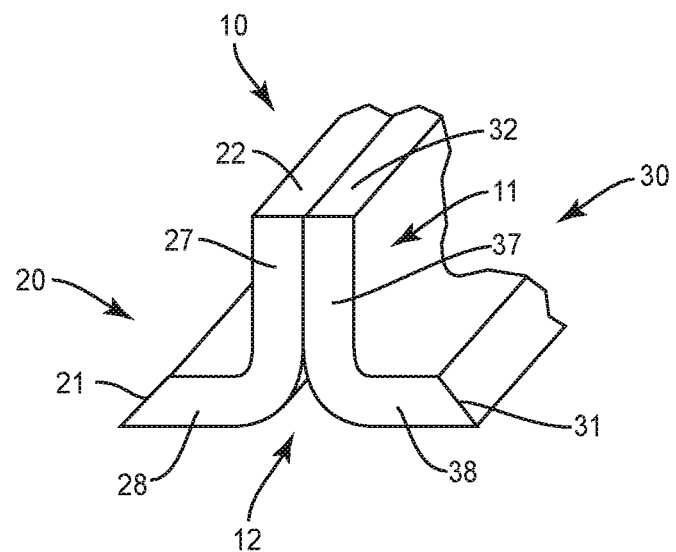
FIG. 1 is a partial perspective end view of a stringer that includes first and second charges.

FIG. 1 illustrates a stringer 10 constructed from a first charge 20 and a second charge 30 that are positioned in a back-to-back orientation. The first charge 20 includes a first blade end 22 and an opposing second flange end 21. Likewise, the second charge 30 includes a first blade end 32 and an opposing second flange end 31. The stringer 10 includes a blade section 11 formed by blades 27, 37 that include the blade ends 22, 32 of the first and second charges 20, 30. The stringer 10 also includes a flange section 12 that includes a flange 28 at a second section of the first charge 20 that includes the flange end 21 and a flange 38 at a second section of the second charge 30 that includes the flange end 31. The sizes and shapes of the blade section 11 and flange section 12 can vary. One stringer 10 includes the blade section 11 being perpendicular to the flange section 12. Other stringers 10 can include different angular positioning between the blade section 11 and flange section 12, as well as different shapes and/or sizes.

The first and second charges 20, 30 can be constructed from a single ply, or can be constructed from multiple plies of composite material. One example includes the first and second charges 20, 30 formed from plies of composite material, such as but not limited to carbon fiber reinforced plastic (CFRP), carbon fiber reinforced polymer, carbon fiber reinforced thermoplastic, and fiberglass reinforced plastic (FRP).

Figure 2:
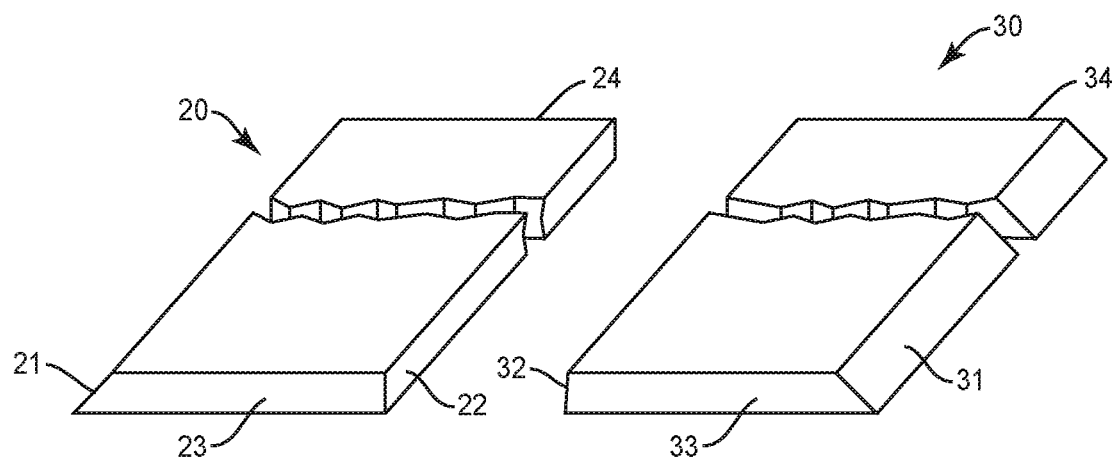
FIG. 2 is a perspective view of first and second charges.

The charges 20, 30 are initially processed to be formed into the stringer 10. As illustrated in FIG. 2, each charge 20, 30 initially includes a relatively flat elongated shape. The first charge 20 includes the flange end 21 and opposing blade end 22. The first charge 20 also has a length that extends between the third and fourth ends 23, 24. Likewise, the second charge 30 includes the flange end 31, blade end 32, and third and fourth ends 33, 34. In one design, the third and fourth ends 23, 33, 24, 34 are inboard and outboard ends when the stringer 10 is used with a panel of a vehicle.

Figure 3:
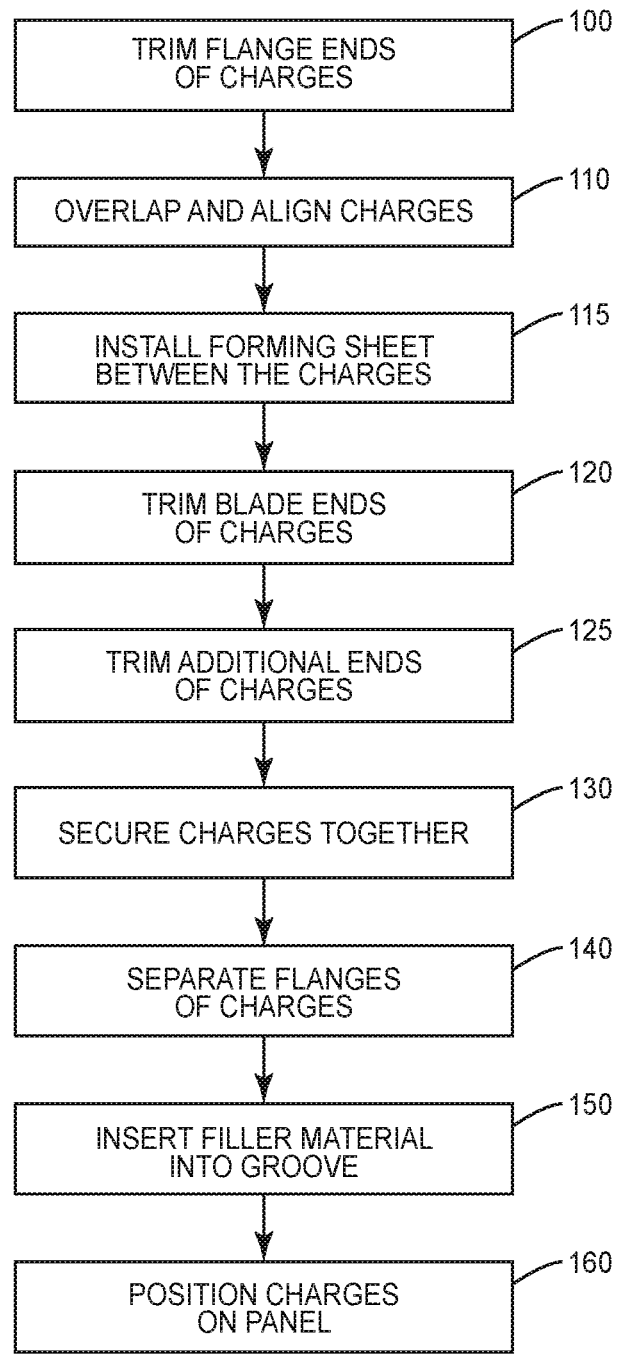
FIG. 3 is a flowchart diagram of steps of manufacturing a panel for a vehicle.

FIG. 3 illustrates a method of manufacturing a panel that includes forming the stringer 10 with first and second charges 20, 30. The specific steps of FIG. 3 will also be disclosed in corresponding FIGS. 4-13.

Figure 4:
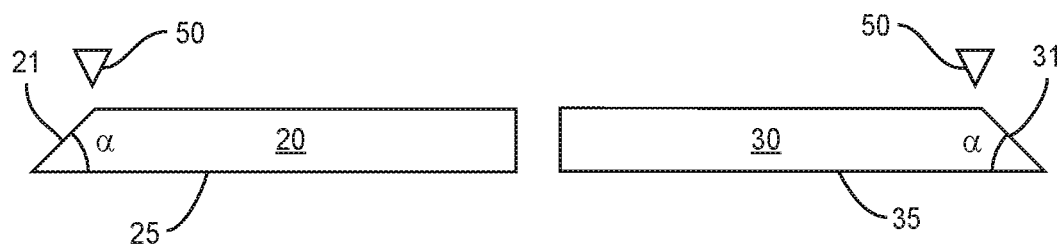
FIG. 4 is an end view of cutting tools and first and second charges.

The method includes trimming the flange ends 21, 31 of the first and second charges 20, 30 to the desired shape and/or orientation (block 100) as illustrated in FIG. 4. The same or different cutting tools 50 can be used to remove material from each of the ends 21, 31. FIG. 4 includes the flange end 21 of the first charge 20 being trimmed to form an angle α relative to a bottom side 25. Similarly, the flange end 31 of the second charged 30 is trimmed to an angle α relative to the bottom side 35. The angles α on the two charges 20, 30 can be the same or different. Further, the angles α can vary depending upon the context of use of the stringer 10. Further, the angles α of one or both charges 20, 30 can vary along the length (i.e., between the third and fourth ends 23, 24, 33, 34). This trimming process enables later in the process high-precision alignment of the blade tips which prevents misalignments, the risk of resin pooling, and thermal cracking.

The methods can also include not trimming the flange ends 21, 31 prior to stacking the charges 20, 30 as well as trimming the charges 20, 30 individually and stacking the charges 20, 30 together ply-by-ply.

Figure 5:
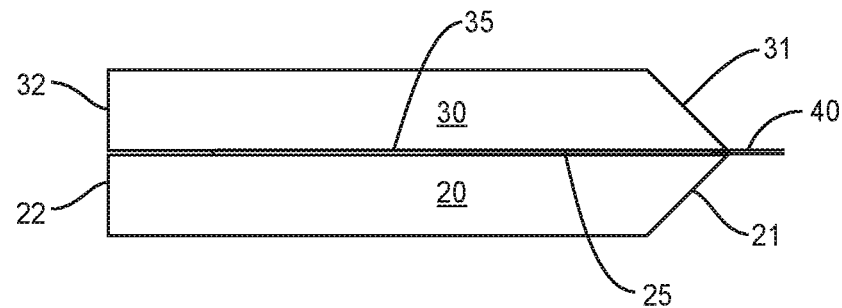
FIG. 5 is an end view of a forming sheet positioned between overlapping first and second charges.

The charges 20, 30 are then placed in an overlapping orientation as illustrated in FIG. 5 (block 110). This can include placing the charges 20, 30 in a stacked configuration. Further, the charges 20, 30 can be aligned along one or more of the ends. This can include aligning the flange ends 21, 31 which were already trimmed to the desired shape and/or orientation. The method can also include aligning different sections of the first and second charges 20, 30. The charges 20, 30 are stacked with the bottom sides 25, 35 facing together.

Forming sheet 40 is placed between the first and second charges 20, 30 (block 115). The forming sheets 40 can be positioned to extend outward beyond the flange ends 21, 31. The forming sheets 40 can include a single sheet folded into two plies, or two separate sheets that are placed together in an overlapping arrangement. FIG. 5 includes the forming sheets 40 being a single sheet that is folded into two plies with a first ply contacting against the first charge 20 and the second ply contacting against the second charge 30. The forming sheets 40 can be constructed from various materials, including but not limited to Teflon and Armalon. The forming sheets 40 can also be constructed from strong flexible fibers from natural sources such as cotton and wool or synthetic fibers such as polyester and nylon. The forming sheets 40 can also be constructed from various combinations of these materials.

Figure 6:
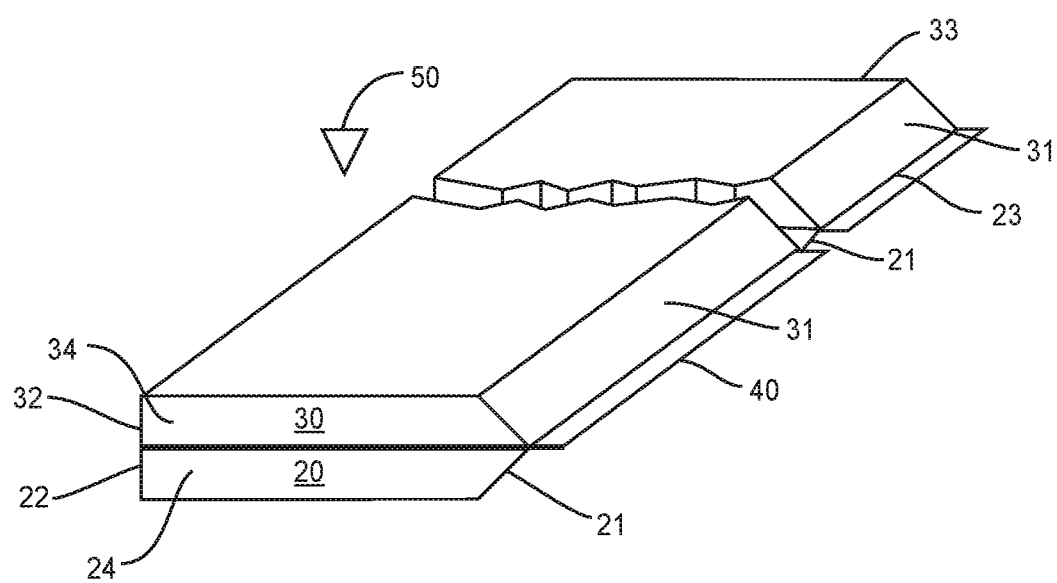
FIG. 6 is a perspective view of a cutting tool and first and second charges.

Once the first and second charges 20, 30 are overlapped, one or more of the remaining ends of the charges 20, 30 can be trimmed (block 120) as illustrated in FIG. 6. This can include trimming the blade ends 22, 32. One trimming method includes trimming the blade ends 22, 32 to be square. Other trimming methods can include different trimming shapes. Additional and/or other ends can also be trimmed as needed. The trimming can be performed by one or more cutting tools 50 that move along the one or more edges that are to be trimmed. With the charges 20, 30 in the overlapping orientation, the trimming results in the desired edges of the charges 20, 30 being aligned relative to each other. The trimming can simultaneously cut both first and second charges 20, 30 along one or more of the ends such that the two are closely aligned. Variations along the ends of the first and second charges 20, 30 can be removed such that the corresponding ends are substantially the same and aligned.

Figure 7:
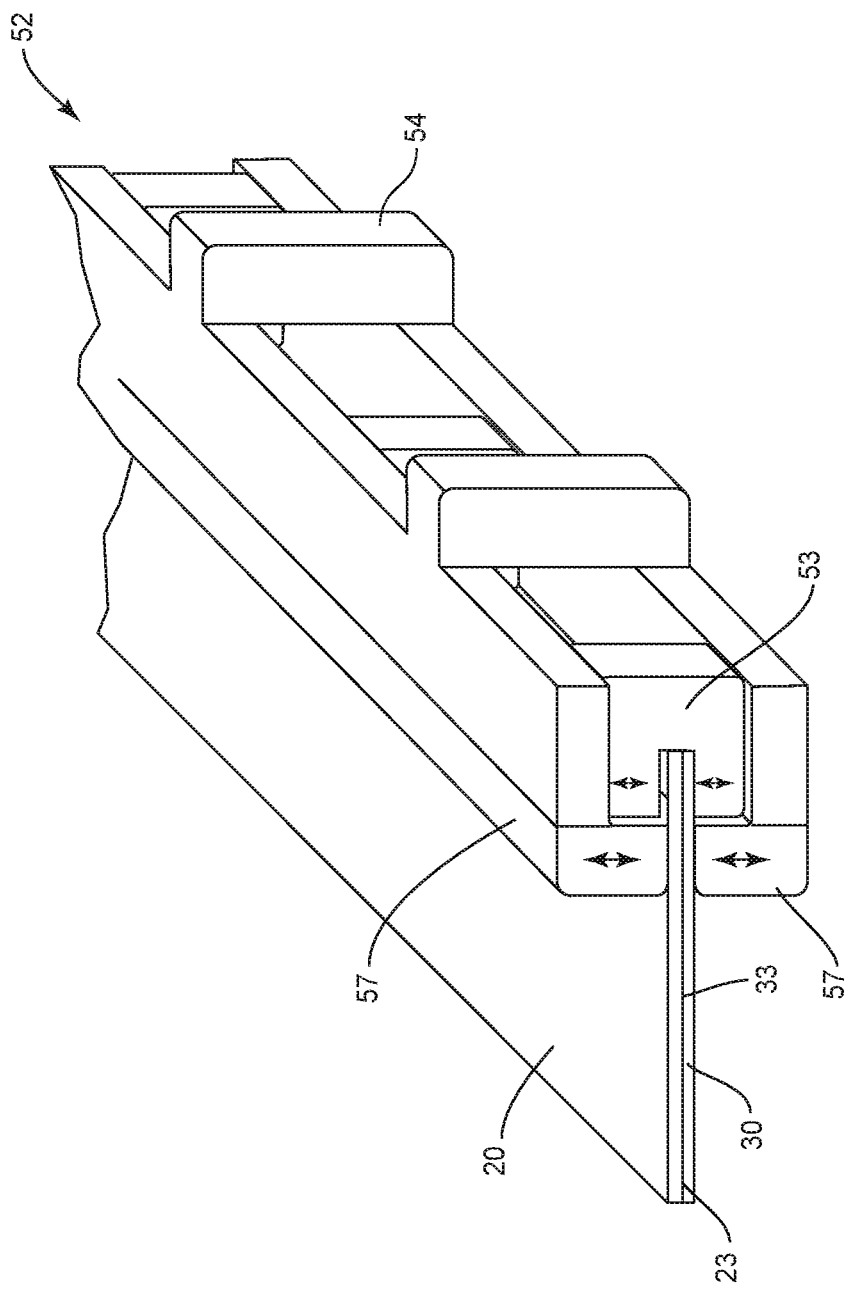
FIG. 7 is a partial perspective view of a stringer tool attached to first and second charges.

With the charges 20, 30 aligned, the charges 20, 30 are secured together (block 130). As illustrated in FIG. 7, this can include attaching a stringer tool 52 to the charges 20, 30. The stringer tool 52 functions to secure together the first and second charges 20, 30 during forming and also to transport the first and second charges 20, 30. The use of a single stringer tool 52 to perform both functions prevents having to swap tools which could lead to relaxing and sagging of the charges 20, 30 which could lead to undesired fiber buckling and/or wrinkling.

As illustrated in FIG. 7, the stringer tool 52 includes a primary clamp 53 and a secondary clamp 54. The primary clamp 53 holds the blade ends 22, 32 stable during the forming and placement process. The primary clamp 53 can be secured to the charges 20, 30 during the process until the charges 20, 30 are placed onto the panel 60 as will be explained below. The secondary clamp 54 maintains the forming sheets 40 in position between the charges 20, 30. The secondary clamp 54 includes form blocks 57 that can be moved into and out of contact with the charges 20, 30. The form blocks 57 can extend along the length of the charges 20, 30 and can include various shapes to conform to the charges 20, 30. The form blocks 57 can be straight, curved, symmetrical, asymmetrical, or other to match and accommodate the shape of the charges 20, 30 long the length. The form blocks 57 can include a single elongated member, or can be constructed from different sections that are independently adjustable to conform to the shape of the charges 20, 30 along the length. The form blocks 57 are interchangeable with other form blocks 57 having different shapes and/or sizes depending upon the charges 20, 30.

Figure 8:
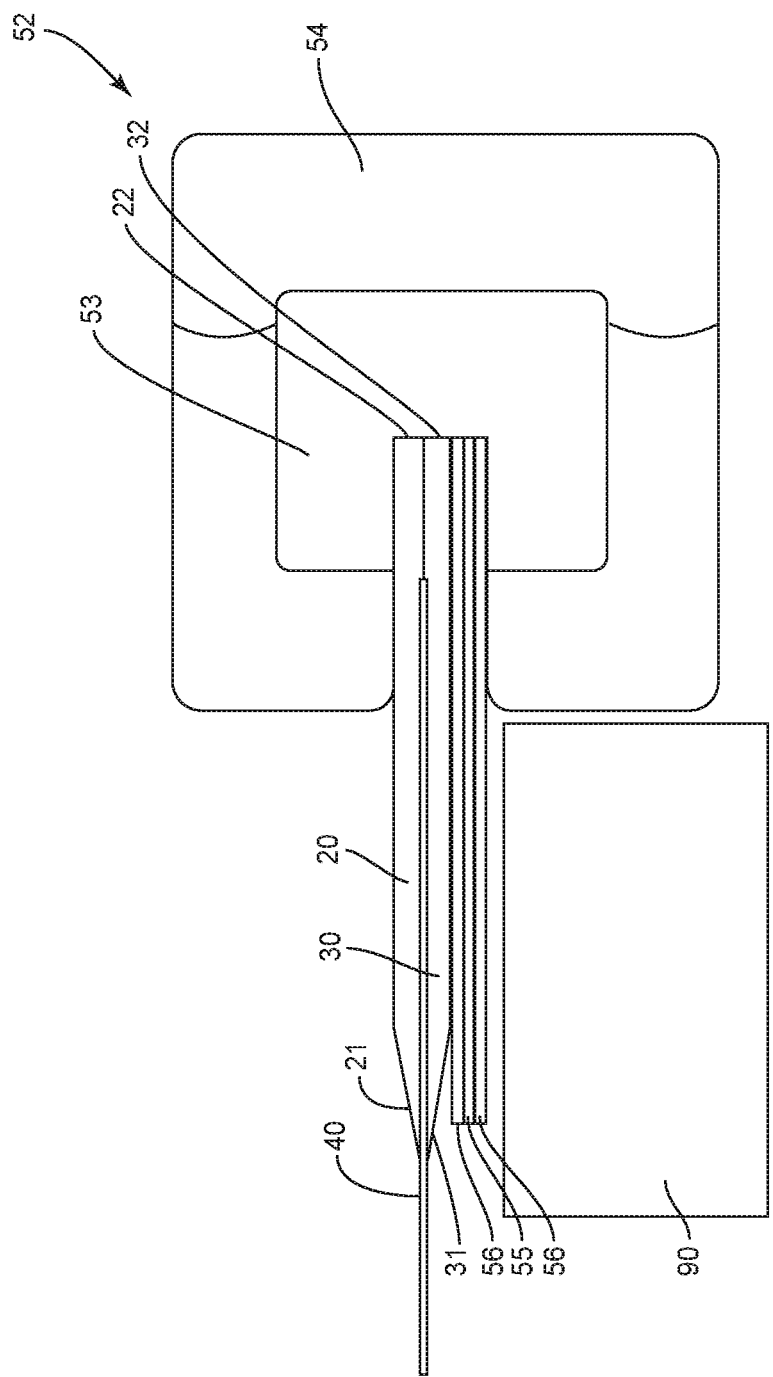
FIG. 8 is a side view of a stringer tool attached to first and second charges and a support plate that supports the flanges of the first and second charges while cantilevered over a table edge.

FIG. 8 illustrates a side view of the stringer tool 52 attached to the charges 20, 30. The primary clamp 53 is positioned in closer proximity to the blade ends 22, 32 of the charges 20, 30. The secondary clamp 54 extends farther along the charges 20, 30 towards the flange ends 21, 31 and is away from the primary clamp 53. The forming sheets 40 are positioned between the charges 20, 30 and can extend outward beyond the flange ends 21, 31.

As illustrated in FIG. 8, a stiff plate 55 can be positioned below the charges 20, 30 for support. The stiff plate 55 prevents the charges 20, 30 from sagging which could cause undesired fiber wrinkling/buckling. One or more handling sheets 56 can be positioned against the stiff plate 55. The handling sheets 56 prevents the second charge 30 (the lower charge in FIG. 8) from adhering to the stiff plate 55 and the stringer tool 52 from adhering to the stiff plate 55. The handling sheet 56 can have the same or different construction than the forming sheet 40 positioned between the charges 20, 30. One design includes both the forming sheets 40 and handling sheets 56 being Teflon. The stiff plate 55 can also be treated to prevent adherence to the charges 20, 30. This stiff plate 55 can be used without a handling sheet 56 and contact directly against the lower charge 20, 30. As also illustrated in FIG. 8, the charges 20, 30 can be positioned on a support 90. The support 90 again prevents sagging of the charges 20, 30. To facilitate attachment of the stringer tool 52, the charges 20, 30 can be positioned with the blade ends 22, 32 extending outward beyond the support 90.

One or more clamping plates 58 can be positioned between the primary clamp 53 and the charges 20, 30. The clamping plates 58 can include a flat interior side that contacts against the flat sides of the charges 20, 30 to distribute the clamping force applied by the primary clamp 53. The clamping plates 58 can prevent the primary clamp 53 from damaging the charges 20, 30, such as creating undesired formed wrinkles.

Figure 9:
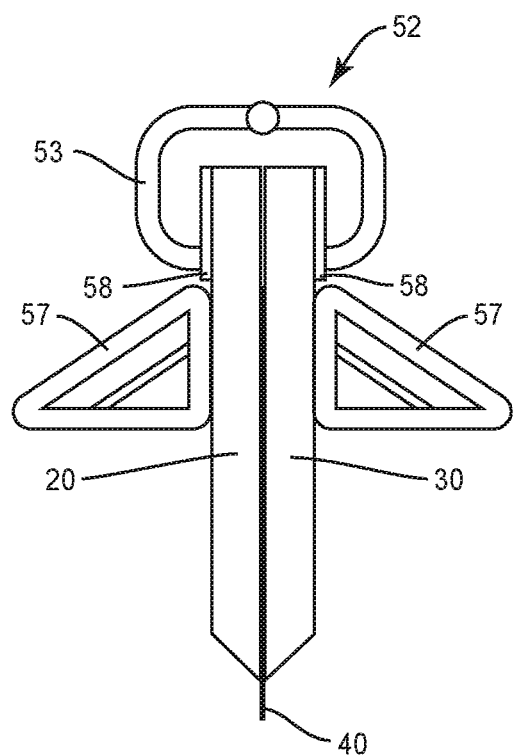
FIG. 9 is an end view of a stringer tool securing together first and second charges.

The stringer tool 52 can include various different configurations. FIG. 9 illustrates a stringer tool 52 that includes the primary clamp 53 and the secondary clamp 54 attached to the first and second charges 20, 30. The stringer tool 52 can be a component of a larger robotic mechanism configured to grasp the charges 20, 30. FIG. 9 includes the primary clamp 53 with a hinged design. The primary clamp 53 can include various different configurations including but not limited to opposing sides with a translational degree of freedom. The stringer tool 52 can also be attached to an overhead crane system or other mechanical transportation and handling system.

As illustrated in FIG. 8, the stiff plate 55 and the handling sheets 56 can be removed from the stringer tool 52. These can be removed simultaneously, or can be removed separately. Once removed, the stringer tool 52 can again be tightened to ensure a secure attachment to the first and second charges 20, 30.

Figures 10A, 10B:
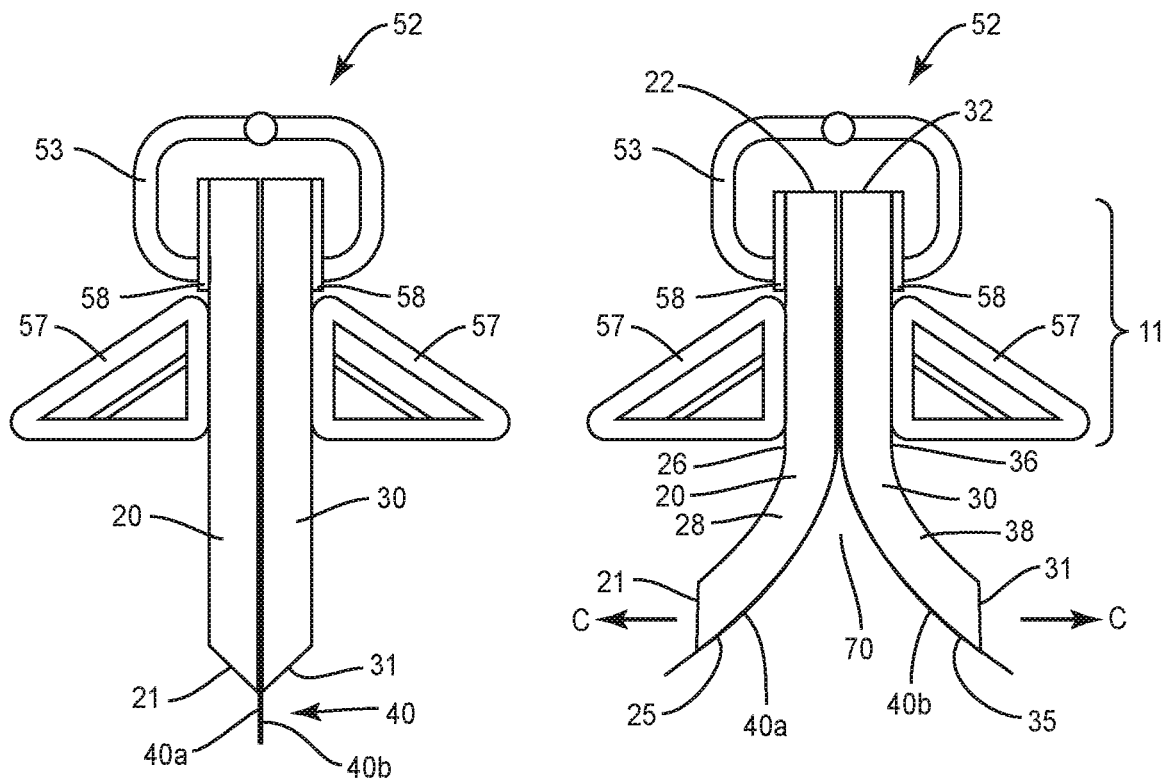
FIG. 10A is an end view of a forming sheet extending outward from flange ends and an stringer tool securing together first and second charges.
FIG. 10B is an end view of the first and second charges of FIG. 10A being separated along a flange section.

With the charges 20, 30 secured together, the flanges 28, 38 of the charges 20, 30 are separated (block 140) as illustrated in FIGS. 10A and 10B. Prior to forming, the charges 20, 30 can be heated to facilitate the forming process. Heating can occur through the form blocks 57 that are in contact with the charges 20, 30. Heating can also occur through other methods, such as placing heat pads placed into contact with the charges 20, 30 and heating the environment in which the charges 20, 30 are located.

As illustrated in FIG. 10A, the charges 20 are initially relative straight and arranged in a back-to-back orientation along their height. The forming sheets 40 are positioned between the charges 20, 30 and can extend outward beyond the flange ends 21, 31. The forming sheets 40 can be spaced inward and away from the blade ends 22, 32 of the charges 20, 30. The forming sheets 40 can include a first layer 40*a* in contact with the first charge 20 and a second layer 40*b* in contact with the second charge 30. The forming sheet 40 can include different layers of material or can be a single sheet that is folded into the first and second layers 40*a*, 40*b*.

As illustrated in FIG. 10B, forces C are applied to the forming sheet layers 40*a*, 40*b*. These forces C separate apart the flange ends 21, 31 to points 26, 36 along the charges 20, 30. The flanges of the charges 20, 30 can be separated and shaped by varying amounts. This can include the bottom sides 25, 35 of the charges 20, 30 at the flange ends 21, 31 being perpendicular to the blade section 11 that remains in a back-to-back orientation and extends inward from the blade ends 22, 32. The charges 20, 30 can be separated by differing amounts with a groove 70 formed between the flanges 28, 38. After separating the charges 20, 30, the forming sheets 40 are removed. Removal of the forming sheets 40 can include reducing the force of the secondary clamp 54 to allow for the removal.

The forming sheets 40 are used for applying the forces C to the charges 20, 30 to separate and form the flanges 28, 38. The forces C can be simultaneously applied to simultaneously deform each of the first and second charges 20, 30. The forces C can be applied separately with a first force C applied to one of the first and second charges 20, 30, and then the second force applied afterwards to the other charge 20, 30.

Figure 11:
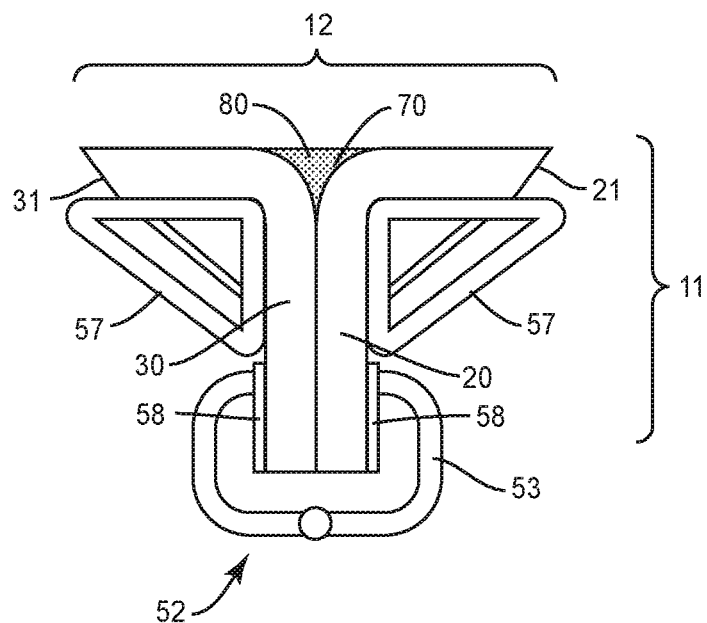
FIG. 11 is an end view of a flange section and a blade section of first and second charges that are secured together with a stringer tool and radius filler inserted.
Figure 12:
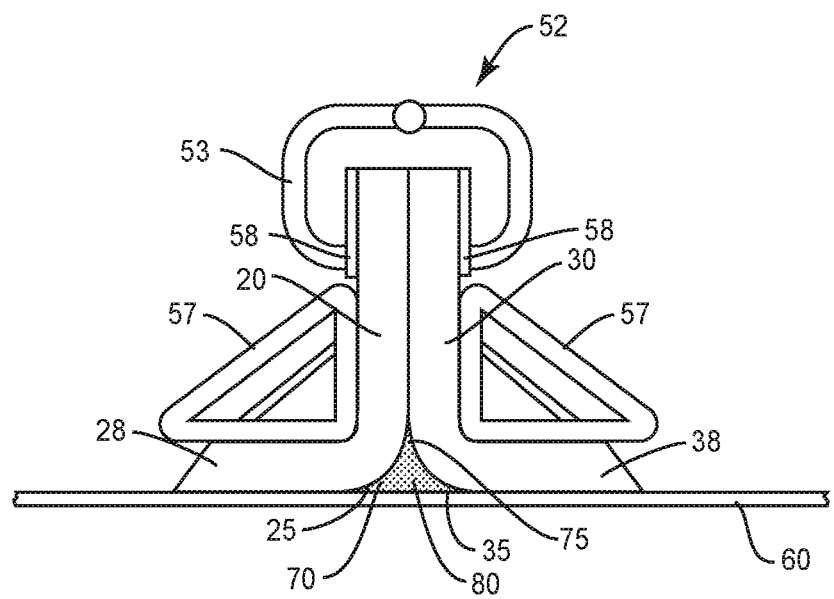
FIG. 12 is an end view of flanges of a first charge, a second charge and radius filler contacting against a panel with a stringer tool securing together the first and second charges.

A composite filler material 80 can be placed into the groove 70 (block 150) to include a narrowed section 75 as illustrated in FIG. 11. After the filler material 80 has been placed in the groove 70, the charges 20, 30 while still attached to the stringer tool 52 are placed onto the panel 60 as illustrated in FIG. 12 (block 160). The first and second charges 20, 30 are placed with the flanges 28, 38 contacting the panel 60. The groove 70 with the filler material 80 is also positioned at the panel 60. After placement, the stringer 10 and panel 60 can be attached together.

Other methods do not include placing composite filler material 80 into the groove 70. The charges 20, 30 can be positioned on the panel 60 without the filler material 80. In yet more additional methods, filler material 80 can be placed into the groove 70 after the charges 20, 30 are placed onto the panel 60. In addition, the panel 60 can be cured in advance and the formed charges 20, 30 later co-bonded to the panel 60 and then cured.

As stated above, the method can include overlapping and aligning the charges 20, 30 (block 110) and placing the forming sheet 40 between the first and second charges 20, 30 (block 115). This process can include multiple steps as illustrated in FIGS. 14-17.

Figure 13:
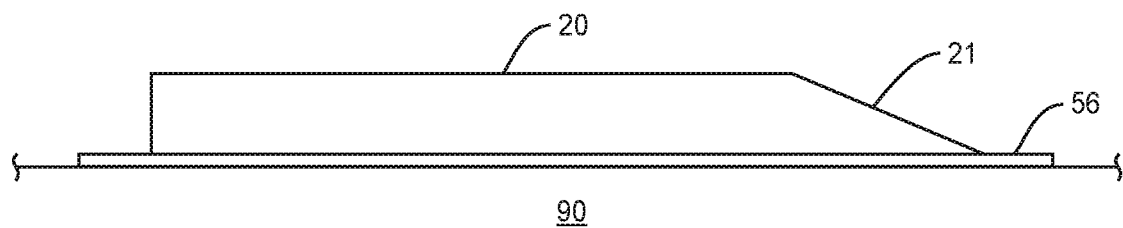
FIG. 13 is a side view of a charge positioned on a handling sheet.
Figure 14:
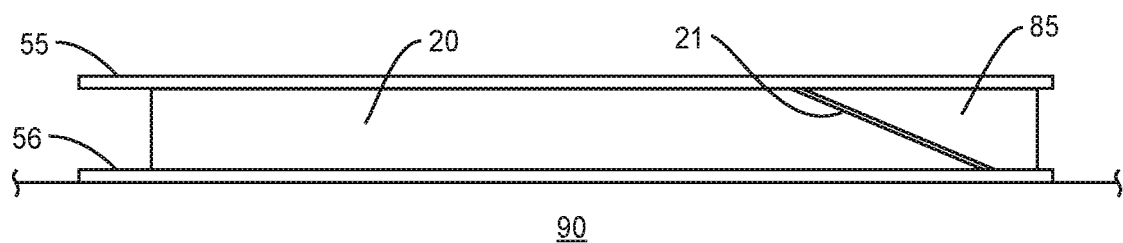
FIG. 14 is a side view of a stiff plate positioned on a charge.

It may be necessary to flip the first charge 20 at the beginning of the process. FIG. 13 illustrates the first charge 20 positioned on a handling sheet 56 on a support 90. The flange end 21 has been trimmed and includes a chamfer. As illustrated in FIG. 14, a support block 85 is positioned against the flange end 21. The support block 85 includes an angled surface that compliments the chamfer on the flange end 21 and prevents bending of the flange end 21. A stiff plate 55 is positioned over the first charge 20 and the support block 85.

Figure 15:
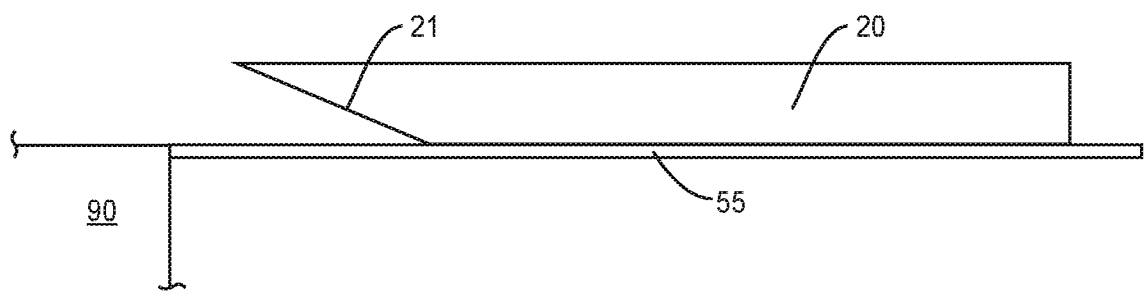
FIG. 15 is a side view of a charge positioned on a stiff plate that is being transported to a support.

The handling sheet 56 and stiff plate 55 are used to flip the first charge 20 and the entirety is rotated 180° as illustrated in FIG. 15. The stiff plate 55 is then aligned with a surface of the support 90 that also includes another handling sheet 56. This handling sheet 56 can be secured to the support 90, such as by tape that extends around the perimeter edge. The first charge 20 is then slid from the stiff plate 55 onto the handling sheet 56 and the support 90. The first charge 20 is oriented with the chamfered flange end 21 downward towards the support 90.

Figure 16:
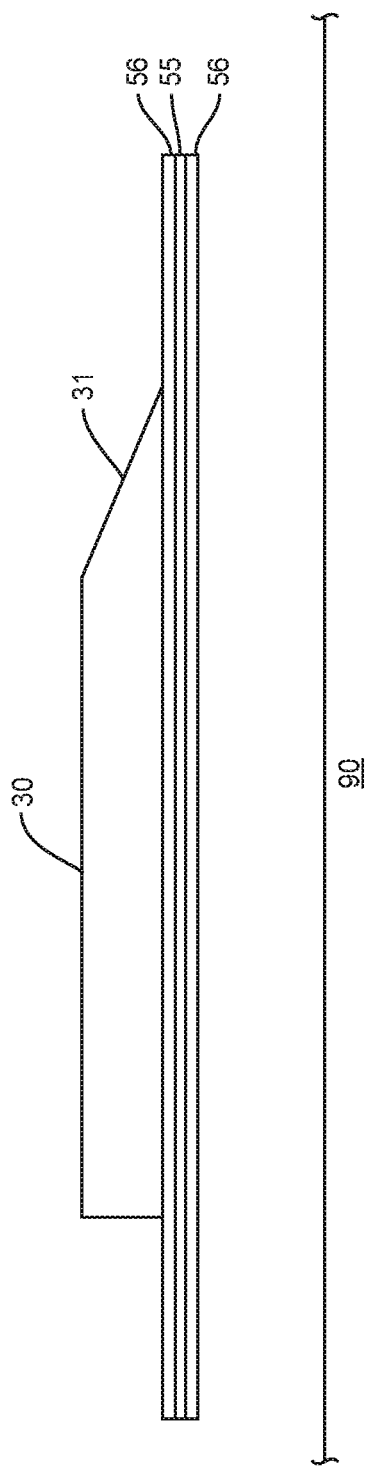
FIG. 16 is a side view of a charge positioned on a stiff plate and with handling sheets positioned on opposing sides of the stiff plate.
Figure 17:
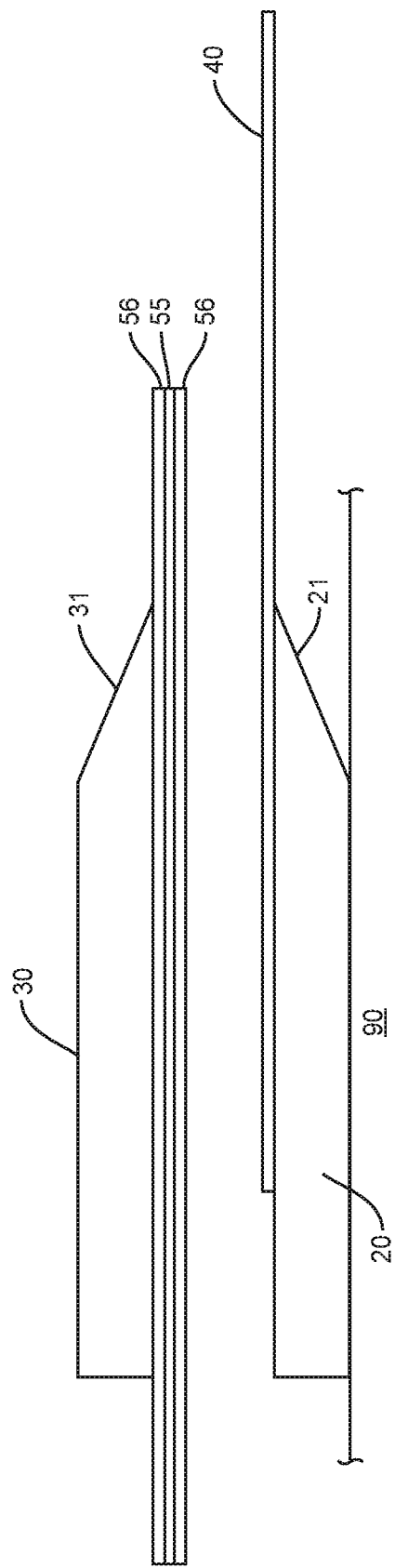
FIG. 17 is a side view of a second charge on a stiff plate being transported to a first charge.
Figure 18:
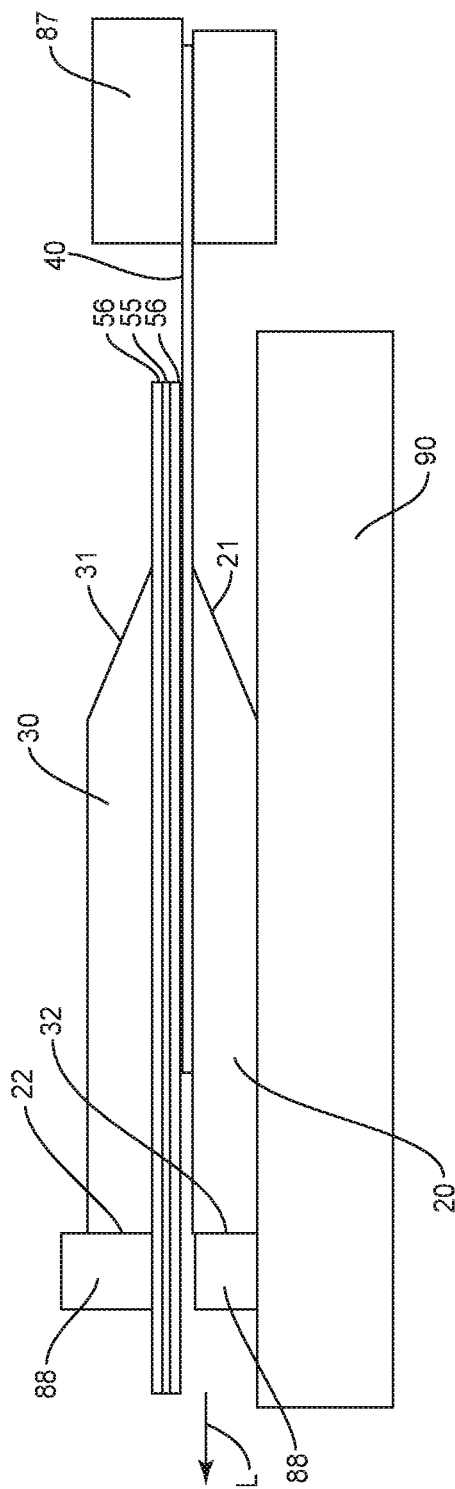
FIG. 18 is a side view of first and second charges stacked together and with a stiff plate and handling sheets being removed from between the first and second charges.

Overlapping the second charge 30 onto the first charge 20 can occur in a variety of different processes. FIG. 16-18 illustrates one process. FIG. 16 includes the second charge 30 positioned on a stiff plate 55. Handling sheets 56 can be positioned between the second charge 30 and the stiff plate 55. A handling sheet 56 can also be positioned on an opposing side of the stiff plate 55. As illustrated in FIG. 17, the second charge 30 is moved by the stiff plate 55 to the first charge 20.

As illustrated in FIG. 18, the second charge 30, stiff plate 55, and handling sheets 56 are placed onto the first charge 20 and the forming sheets 40. Blocks 88 can be positioned at the blade ends 22, 32 of the first and second charges 20, 30. Further, a clamping tool 87 can be attached to the forming sheets 40 where they extend outward beyond the flange ends 21, 31 of the first and second charges 20, 30.

The handling sheets 56 and stiff plate 55 are then pulled in the direction of arrow L and moved outward from between the first and second charges 20, 30. The blocks 88 maintain the position of the first and second charges 20, 30 on the support 90. Additionally, the clamping tool 87 prevents the forming sheets 40 from being moved from between the first and second charges 20, 30.

During the forming process, the forming sheets 40 can be handled in various manners to apply the forces to the charges 20, 30. A clamping tool 87 or actuators can grasp the exposed ends of the forming sheets 40 and applying the forces. Elongated members such as ropes can be attached to the exposed ends of the forming sheets 40 to facilitate the handling.

Figure 20:
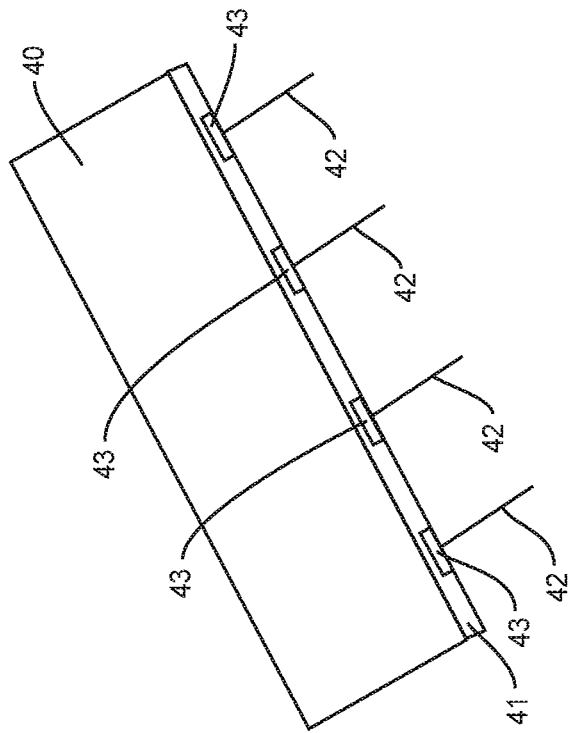
FIG. 20 is a perspective view of a forming sheet with a stiffening strip and elongated members extending from the stiffening strip.
Figure 19:
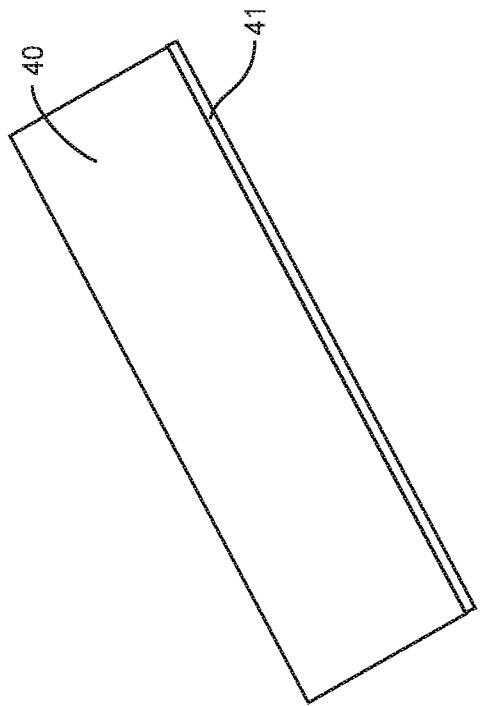
FIG. 19 is a perspective view of a forming sheet with a stiffening strip.

The forming sheets 40 can include stiffening strips 41 along one of the sides as illustrated in FIG. 19. The stiffening strips 41 transfer a more distributed pull across the forming sheets 40 during the bending process. The stiffening strips 41 can be positioned on one or both sides of the forming sheets 40, and can be constructed of various materials, including but not limited to metal and plastic. The stiffening strips 41 can be attached to the forming sheets 40 in various manners, including but not limited to adhesives and various mechanical fasteners such as brackets and rivets. As illustrated in FIG. 20, elongated members 42 can be attached to the stiffening strips 41. Tabs 43 can be attached to the stiffening strips 41 to position the elongated members 42. Alternatively, the elongated members 42 can be attached directly to the stiffening strips 41.

Figure 21:
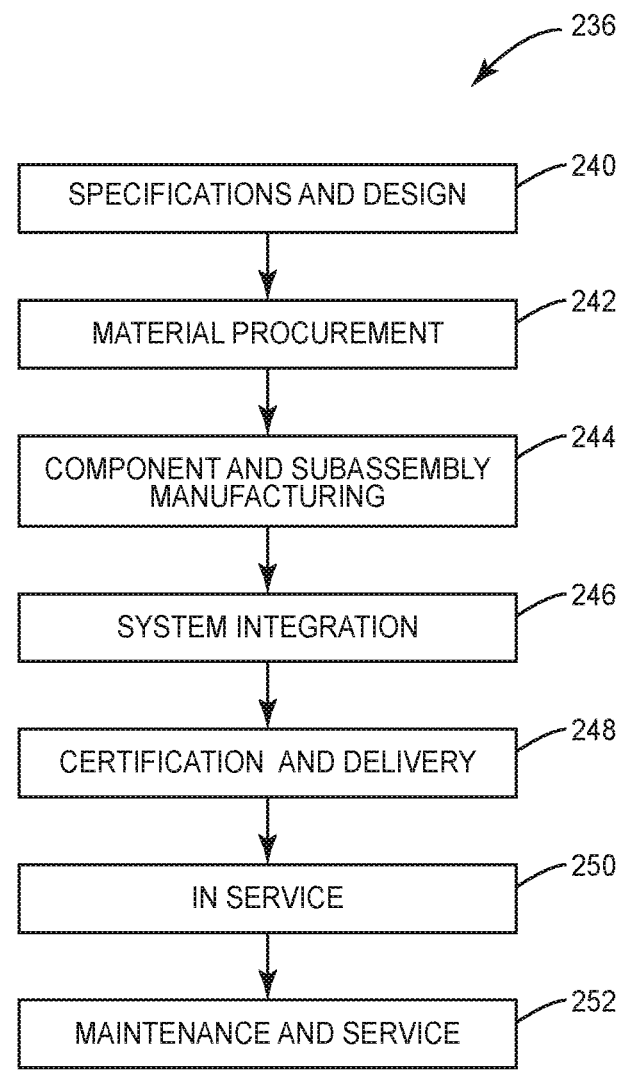
FIG. 21 is a flow diagram of a vehicle production and service methodology.
Figure 22:
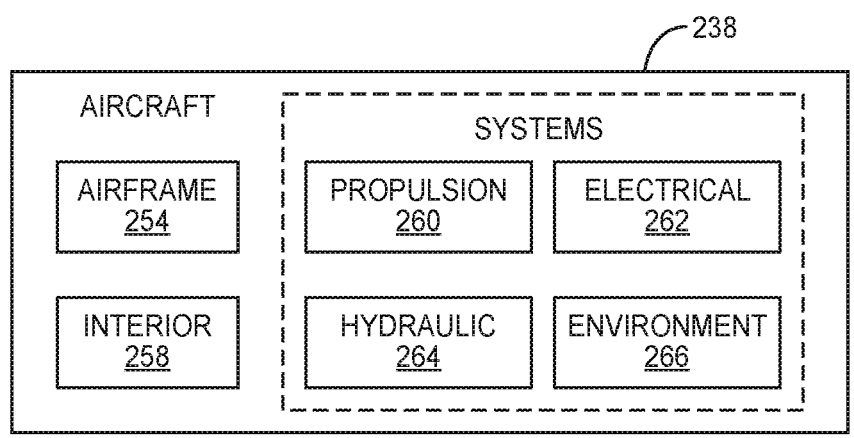
FIG. 22 is a block diagram of a vehicle.

The stringers 10 and fabrication methodologies can being used in a variety of potential applications, particularly in the transportation industry, including for example, aerospace, marine, automotive applications and other application where automated layup equipment can be used. The stringers 10 and methodologies can be used in the context of a vehicle manufacturing and service method 236 as illustrated in FIG. 21 and a vehicle 238 such as an aircraft as illustrated in FIG. 22. During pre-production, exemplary methods 236 can include specification and design 240 of the vehicle 238 and material procurement 242. During production, component and subassembly manufacturing 244 and system integration 246 of the vehicle 238 takes place. Thereafter, the vehicle 238 can go through certification and delivery 248 in order to be placed in service 250. While in service by a customer, the vehicle 238 is scheduled for routine maintenance and service 250, which can also include modification, reconfiguration, refurbishment, and so on.

The processes of method 236 can be performed or carried out by a system integrator, a third party, and/or an operator (e.g., a customer). For the purposes of this description, a system integrator can include without limitation any number of vehicle manufacturers and major-system subcontractors; a third party can include without limitation any number of vendors, subcontractors, and suppliers; and an operator can be an airline, leasing company, military entity, service organization, and so on.

As shown in FIG. 22, the vehicle 238 produced by exemplary method 236 can include an airframe 254 with a plurality of systems 256 and an interior 258. Examples of high-level systems 256 include one or more of a propulsion system 260, an electrical system 262, a hydraulic system 264, and an environmental system 266. Any number of other systems can be included. Although an aerospace example is shown, the principles of the disclosure can be applied to other industries, such as the marine and automotive industries.

Systems and methods embodied herein can be employed during any one or more of the stages of the production and service method 236. For example, components or subassemblies corresponding to component and subassembly manufacturing 244 can be fabricated or manufactured in a manner similar to components or subassemblies produced while the vehicle 238 is in service. Also, one or more apparatus embodiments, method embodiments, or a combination thereof can be utilized during the component and subassembly manufacturing 244 and system integration 246, for example, by substantially expediting assembly of or reducing the cost of a vehicle 238. Similarly, one or more of apparatus embodiments, method embodiments, or a combination thereof can be utilized while the vehicle 238 is in service, for example and without limitation, to maintenance and service 252.

The stringer 10 can be attached to various panels, including but not limited to the wing skin, bulkhead, and fuselage of a vehicle. The stringer 10 can be used on a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of manufacturing a panel for a vehicle, the method comprising:
   trimming second ends of each of first and second charges;
   overlapping the first and second charges and aligning the second ends and positioning forming sheets between the first and second charges;
   clamping blades of the first and second charges together, the blades being positioned on an opposing end of the first and second charges from the second ends;
   while the first and second charges are secured together, using the forming sheets and separating and bending the first and second charges at the second ends and forming first and second flanges;
   filling a groove formed between the first and second flanges with a filler material;
   while the first and second charges are secured together, placing the first and second flanges on a panel with the first and second flanges contacting against the panel and the groove positioned at the panel; and
   after bending, releasing the first and second charges.

2. The method of claim 1,
   further comprising trimming first ends of the first and second charges after aligning the second ends and prior to clamping the blades together.

3. The method of claim 1, wherein overlapping the first and second charges comprises stacking the first and second charges together with the forming sheets between the first and second charges.

4. The method of claim 1,
   wherein clamping blades of the first and second charges together comprises attaching a stringer tool to the blades with the stringer tool comprising a primary clamp that attaches to the charges at first ends and a secondary clamp that attaches to the charges along the blades and being spaced away from the primary clamp.

5. The method of claim 1, wherein positioning forming sheets between the first and second charges comprises folding a single sheet and forming first and second sheet layers with the first sheet layer contacting against the first charge and the second sheet layer contacting against the second charge.

6. The method of claim 1, further comprising one of co-bonding or co-curing the panel and the first and second charges.

7. The method of claim 1,
   further comprising clamping the blades of the first and second charges together with a stringer tool that remains attached to the first and second charges while placing the first and second flanges on the panel.

8. The method of claim 1, wherein trimming the second ends of each of the first and second charges comprises trimming the second ends individually and then overlapping and aligning the first and second charges.

9. The method of claim 1, wherein positioning the forming sheets between the first and second charges comprises placing first and second forming sheets in an overlapping arrangement between the first and second charges.

10. The method of claim 1, further comprising positioning the forming sheets between the first and second charges and extending the forming sheets outward beyond the second ends of the first and second charges.

11. The method of claim 1, further comprising simultaneously trimming the first ends of the first and second charges while the first and second charged are overlapping and thereby aligning the first ends.

12. A method of manufacturing a panel for a vehicle, the method comprising:
stacking together first and second charges and aligning at least one end of each of the first and second charges, each of the first and second charges comprising a flange end and a blade end;
positioning first and second forming sheets between the first and second charges that are stacked together;
clamping the first and second charges together;
while the first and second charges are clamped together, pulling apart the first and second forming sheets and forming a first flange with the first charge and a second flange with the second charge with the first and second flanges comprising the flange ends of the respective charges;
filling a groove formed between the first and second flanges with a filler material;
while the first and second charges are secured together, placing the first and second charges on the panel with the first and second flanges contacting against the panel; and after pulling apart, releasing the first and second charges.

13. The method of claim 12, further comprising preparing the first and second charges by trimming the flange ends of each of the first and second charges prior to stacking the first and second charges.

14. The method of claim 12, wherein positioning the first and second forming sheets between the first and second charges that are stacked together comprises folding a beginning sheet into first and second layers with the first layer comprising the first forming sheet and the second layer comprising the second forming sheet.

15. The method of claim 14, further comprising unfolding the beginning sheet while pulling apart the first and second forming sheets and forming the first and second flanges.

16. The method of claim 12, wherein filling the groove comprises inserting a filler material into the groove prior to placing the first and second charges onto the panel.

17. The method of claim 12,
wherein clamping the first and second charges together comprises attaching a stringer tool to blades of the first and second charges with the stringer tool comprising a primary clamp that attaches to the first and second charges at first ends and a secondary clamp that attaches to the first and second charges along the blades and spaced away from the primary clamp.

18. The method of claim 12, wherein positioning the first and second forming sheets between the first and second charges that are stacked together comprises placing first and second forming sheets in an overlapping arrangement between the first and second charges.

19. The method of claim 12, further comprising positioning the first and second forming sheets outward beyond the flange ends of the first and second charges prior to clamping the first and second charges together.

20. The method of claim 12, further comprising forming the first and second charges with the first and second flanges perpendicular to blades.

* * * * *